(12) United States Patent
Galina

(10) Patent No.: US 6,582,602 B2
(45) Date of Patent: Jun. 24, 2003

(54) METHOD FOR PURIFYING CONTAMINATED UNDERGROUND WATER

(75) Inventor: Chouguina Galina, Moscow (RU)

(73) Assignee: Firma Biomedy AG (CH)

( * ) Notice: Subject to any disclaimer, the term of this patent is extended or adjusted under 35 U.S.C. 154(b) by 0 days.

(21) Appl. No.: 09/895,283

(22) Filed: Jun. 29, 2001

(65) Prior Publication Data

US 2002/0014455 A1 Feb. 7, 2002

(30) Foreign Application Priority Data

Jul. 3, 2000 (RU) .......................................... 00117142

(51) Int. Cl.⁷ ................................................. C02F 3/00
(52) U.S. Cl. ....................... 210/620; 210/757; 210/758; 210/170; 210/746
(58) Field of Search ................................ 210/620, 757, 210/758, 170, 746

(56) References Cited

U.S. PATENT DOCUMENTS 5,738,789 A    4/1998  Shugina

FOREIGN PATENT DOCUMENTS

RU           1838598      8/1993

OTHER PUBLICATIONS

English Abstract of RU2107042.

*Primary Examiner*—Chester T. Barry
(74) *Attorney, Agent, or Firm*—R W Becker & Associates; R W Becker

(57) ABSTRACT

A purification method for purifying contaminated underground water comprises the steps of characterizing the soil composition at the location of the contaminated water, taking a sample of the contaminated underground water from one or more wells at the location of contaminated water, characterizing the concentrations of contaminants in the collected sample, introducing into the sample a nutrient environment comprising mineral and organic components to effect the growth of sulfate reducing bacteria, accumulating a biomass of selected sulfate reducing bacteria, and introducing the biomass into the contaminated water via one or more wells at the location of the contaminated water. The method further includes sampling an anthropogeneous contaminant and, in the event that a proportion of the concentrations of the contaminating components of the blended sample mixture and the contaminated underground water sample exceeds one, the biomass consumption and the number of wells are increased and the addition of a ferricompound is made to at least one of the wells to create negative values of redox potential.

4 Claims, No Drawings

METHOD FOR PURIFYING CONTAMINATED UNDERGROUND WATER

BACKGROUND OF THE INVENTION

The present invention relates to a method for purifying underground water which is contaminated with anthropogeneous pollutants or has been polluted by underground leaching.

A known method of purification of contaminated underground water, described in Russian Patent No. 1838598, Cl. CO2F3/34, 1993, comprises injecting cultured fluid having sulfate reducing bacteria and an organic nutrient source into the contaminated water. The purification efficiency obtained by this method is low.

Another method of purification of contaminated underground water is described in Russian Patent No. 2107042, issued Mar. 20, 1998), and comprises the steps of characterizing the soil composition at the location of the contaminated water, taking a sample of the contaminated underground water from one or more wells at the location of contaminated water, characterizing the concentrations of contaminants in the collected sample, introducing into the sample a nutrient environment comprising mineral and organic components to effect the growth of sulfate reducing bacteria, accumulating a biomass of selected sulfate reducing bacteria, and introducing the biomass into the contaminated water via one or more wells at the location of the contaminated water.

The above-noted purification method, however, suffers from low efficiency since favorable conditions do not exist to promote the activity of the sulfate reducing bacteria. Also, significant expenditures are incurred due to the number of wells involved and the costs of accumulating the biomass.

SUMMARY OF THE INVENTION

The present invention provides a solution to the problem of improving the purification efficiency of a contaminated underground water purification method by a shortening of the time for the sulfate reducing bacteria to effect its activity, thereby reducing operating costs.

The purification method of the present invention comprises the steps of characterizing the soil composition at the location of the contaminated water, taking a sample of the contaminated underground water from one or more wells at the location of contaminated water, characterizing the concentrations of contaminants in the collected sample, introducing into the sample a nutrient environment comprising mineral and organic components to effect the growth of sulfate reducing bacteria, accumulating a biomass of selected sulfate reducing bacteria, and introducing the biomass into the contaminated water via one or more wells at the location of the contaminated water, and further comprises the step of sampling an anthropogeneous contaminant and introducing ferri-compounds into at least one well in response to an assessment of the anthropogeneous contaminant sampling. At least one anthropogeneous contaminant sample is drawn of the respective underground water and from background or reference underground water and soil components. The drawn samples are blended or otherwise permitted to mix and, at a predetermined time, a determination is made of the concentrations of contaminating components comprised in the blended mixture. The concentrations of the contaminating components comprised in the blended mixture are compared to the same respective concentrations of these contaminating components in the sample of the contaminated underground water. Conclusions are then drawn from this comparison of the contaminating components of the blended sample mixture and the contaminated underground water sample with respect to the biomass consumption and the number of wells which are to be involved in the purification operation. In connection with these conclusions, in the event that a proportion of the concentrations of the contaminating components of the blended sample mixture and the contaminated underground water sample exceeds one, the biomass consumption and the number of wells are increased and the addition of a ferri-compound is made to at least one of the wells to create negative values of redox potential. The organic component of the nutrient environment is comprised of series formed by an aqueous solution of clay having a ratio of solids to liquids between 0.001 to 0.003, an aqueous solution of natural carbohydrate polymers at a ratio of solids to liquids between 0.001 to 0.005, or a mixture of such components and higher carbohydrate polymers. The series of higher carbohydrate polymers are formed of vegetative residues, wood sawdust, cane, sedge, and domestic waste.

The method of the present invention enhances the efficiency of the purification operation in that the logarithmic stage of the sulfate reducing bacteria vital activity is shortened and fewer wells are otherwise involved in the purification operation. The ferri-compound creates favorable redox conditions (potential) for vital activity of the sulfate reducing bacteria (SRB).

DETAILED DESCRIPTION OF THE PREFERRED EMBODIMENT

An exemplary application of the method of the present invention for purifying underground water which is contaminated with anthropogeneous pollutants or has been polluted by underground leaching was performed.

Contaminated underground water which had been contaminated by anthropogeneous contaminant produced by a chemical plant was identified as the contaminated underground water to be purified. Components comprising the soils in the area of the contaminated underground water (alluvial sediments and fissured chalk) were characterized.

Samples of the contaminated contaminated water were taken from at least one of the wells located in the area of the contaminated underground water and the concentrations of selected contaminating components of the contaminated underground water were determined. Thereafter, a nutritient environment having mineral and organic components was introduced into a selected sample for the selection of sulfate reducing bacteria (SRB). In this regard, a small amount of the contaminated underground water was introduced into a reservoir and thereafter there was introduced a nutrient environment containing 0.1–0.5 g/l of nitrogenous phosphoric nutrition for SRB in the form of $(NH_4)_2HPO_4$. Higher carbohydrate polymers comprised the organic component of the nutritient environment. At least one sample of the contaminated underground water which contained an anthropogeneous contaminant, at least one sample of a reference or background underground water sample, and at least one sample of the soil had previously been taken. These samples were blended and the concentration of contaminants in the blended sample mixture was determined over a given period of time. Table 1 shows the contaminant concentration values in the contaminated underground water sample and in the blended sample mixture.

| Contaminating Components | Concentration of contaminating components in mg/l in the contaminated underground water | Concentration of contaminating components in mg/l in the blended sample mixture |
|---|---|---|
| $SO_4^{2-}$ | 1850 | 2000 |
| $NO_{3-}$ | 300 | 300 |
| Cr | 0.8 | 0.8 |
| Mn | 8.5 | 10.5 |
| $Fe_{tot.}$ | 48 | 52 |
| Cu | 2.4 | 2.4 |
| Surfactants | 500 | 500 |
| Mo | 0.52 | 0.52 |
| pH | 4.5 | 4.7 |
| Eh, mV | +402 | +412 |

Thereafter, biomass of the selected SRB was introduced into the contaminated underground water through one or more of the wells.

The calculation of the biomass consumption and the number of wells into which biomass was to be introduced took into account the proportion of contaminating components in the blended sample mixture and in the sample of the contaminated underground water. In the event that a proportion of the concentrations of the contaminating components of the blended sample mixture and the contaminated underground water sample exceeded one, the biomass consumption and the number of wells was increased and a ferri-compound such as, for example, iron aluminum, was introduced into at least one of the wells to create negative values of redox potential.

The results of the purification operation on the contaminated underground water are shown in Table 2.

| Element | Concentration, mg/l Before purification | Concentration, mg/l After purification |
|---|---|---|
| $SO_4^{2-}$ | 1850 | 35 |
| $NO_{3-}$ | 300 | 0.00 |
| Cr | 0.8 | 0.03 |
| Mn | 8.5 | 2 |
| $Fe_{tot.}$ | 48 | 0.3 |
| Cu | 2.4 | 0.04 |
| Surfactants | 500 | 0.00 |
| Mo | 0.52 | 0.1 |
| pH | 4.5 | 6.3 |
| Eh, mV | +402 | −20 |

The purification method of the present invention is highly efficient in achieving purification due to the shortening of the logarithmic stage of the SRB vital activity and the decrease in the costs of the purification operation.

The specification incorporates by reference the disclosure of Russian priority document 2000-117 142 of Jul. 3, 2000.

The present invention is, of course, in no way restricted to the specific disclosure of the specification and drawings, but also encompasses any modifications within the scope of the appended claims.

What is claimed is:

1. A method for purifying contaminated underground water, comprising:

characterizing the soil composition at the location of the contaminated water;

taking a sample of the contaminated underground water from one or more wells at the location of contaminated water;

characterizing the concentrations of contaminants in the collected sample;

introducing into the sample a nutrient environment comprising mineral and organic components to effect the growth of sulfate reducing bacteria;

accumulating a biomass of selected sulfate reducing bacteria;

introducing the biomass into the contaminated water via one or more wells at the location of the contaminated water;

sampling each of an anthropogeneous contaminant of the contaminated underground water, background or reference underground water, and soil components;

blending the sampled anthropogeneous contaminant of the contaminated underground water, background or reference underground water, and soil components into a blended sample mixture;

determining the concentrations of contaminating components comprised in the blended sample mixture;

comparing the concentrations of the contaminating components comprised in the blended sample mixture to the same respective concentrations of these contaminating components in the sample of the contaminated underground water in order to draw conclusions with respect to the biomass consumption and the number of wells which are to be involved in the purification operation; and in the event that a proportion of the concentrations of the contaminating components of the blended sample mixture and the contaminated underground water sample exceeds one, increasing the biomass consumption and the number of wells and adding a ferri-compound to at least one of the wells to create negative values of redox potential.

2. The method according to claim 1, wherein the organic component of the nutrient environment is comprised of an aqueous solution of clay having a ratio of solids to liquids between 0.001 to 0.003, an aqueous solution of natural carbohydrate polymers at a ratio of solids to liquids between 0.001 to 0.005, or a mixture of such components and higher carbohydrate polymers.

3. The method according to claim 1 wherein the organic component of the nutrient environment is comprised of higher carbohydrate polymers.

4. The method according to claim 2, wherein said higher carbohydrate polymers are selected from the group consisting of vegetative residues, wood sawdust, cane, sedge, and domestic waste.

* * * * *